United States Patent [19]

Boehme et al.

[11] Patent Number: 5,189,068
[45] Date of Patent: Feb. 23, 1993

[54] PREPARATION OF INTEGRAL SKIN CELLULAR PLASTICS BY THE POLYADDITION PROCESS IN THE PRESENCE OF TERTIARY ALCOHOLS

[75] Inventors: Ralf Boehme, Ludwigshafen; Otto Volkert, Weisenheim, both of Fed. Rep. of Germany

[73] Assignee: BASF Aktiengesellschaft, Ludwigshafen, Fed. Rep. of Germany

[21] Appl. No.: 916,578

[22] Filed: Jul. 20, 1992

Related U.S. Application Data

[63] Continuation of Ser. No. 717,132, Jun. 18, 1991, abandoned.

[30] Foreign Application Priority Data

Jun. 23, 1990 [DE]  Fed. Rep. of Germany ....... 4020079

[51] Int. Cl.$^5$ .............................................. C08J 9/34
[52] U.S. Cl. ..................................... 521/51; 264/45.5;
521/117; 521/159; 521/172; 521/173; 521/174;
521/176; 521/902
[58] Field of Search ................. 521/51, 117, 902, 159,
521/174, 176, 172, 173; 264/45.5

[56] References Cited

U.S. PATENT DOCUMENTS

| | | | |
|---|---|---|---|
| 2,865,869 | 12/1958 | Hindersinn et al. | 521/117 |
| 3,338,846 | 8/1967 | Klopfer . | |
| 3,684,754 | 8/1972 | Barie, Jr. et al. | 521/158 |
| 3,980,594 | 9/1976 | Fabris et al. | 521/108 |
| 4,352,896 | 10/1982 | Kopp . | |
| 4,715,746 | 12/1987 | Mann . | |

*Primary Examiner*—Morton Foelak
*Attorney, Agent, or Firm*—William G. Conger

[57] ABSTRACT

A process for the preparation of cellular plastics, preferably hard structural polyurethane foams, by the polyisocyanate polyaddition process involves reacting
  a) an organic and/or modified organic polyisocyanate with
  b) at least one high-molecular-weight compound containing at least two reactive hydrogen atoms and, if desired,
  c) a low-molecular-weight chain extender and/or cross-linking agent, in the presence of
  d) a blowing agent from the group comprising tertiary alcohols (di), preferably tertiary butanol, or a mixture of at least one tertiary alcohol (di) and water (dii),
  e) a catalyst and, if desired,
  f) assistants and/or additives.

9 Claims, No Drawings

PREPARATION OF INTEGRAL SKIN CELLULAR PLASTICS BY THE POLYADDITION PROCESS IN THE PRESENCE OF TERTIARY ALCOHOLS

This is a continuation Ser. No. 07/717,132 filed on Jun. 18, 1991 now abandoned.

The present invention relates to a process for the preparation of cellular plastics, preferably hard urethane-containing foam moldings having a compacted peripheral zone and a cellular foam core, by the polyisocyanate polyaddition process, by reacting a) an organic and/or modified organic polyisocyanate with b) at least one high-molecular-weight compound containing at least two reactive hydrogen atoms, with the exception of olefinically unsaturated polyesters or alkyd resins, and, if desired, c) a low-molecular-weight chain extender and/or cross-linking agent, in the presence of d) a tertiary alcohol or preferably a mixture of at least one tertiary alcohol and water, as blowing agent, e) a catalyst and, if desired, f) assistants and/or additives.

The preparation of cellular polyisocyanate polyaddition products, for example cellular polyurethane elastomers and flexible, semihard or hard polyurethane foams, by reacting an organic polyisocyanate and/or a modified organic polyisocyanate with a high-molecular-weight compound containing at least two reactive hydrogen atoms, for example a polyoxyalkylene-polyamine and/or preferably an organic polyhydroxyl compound having a molecular weight of, for example, from 500 to 12,000, and, if desired, a chain extender and/or crosslinking agent having a molecular weight of about 500, in the presence of a catalyst, a blowing agent, assistants and/or additives has been disclosed in numerous patent and other publications. By a suitable choice of the polyisocyanate, the high-molecular-weight compound containing reactive hydrogen atoms and, if used, the chain extender and/or crosslinking agent, this method allows the preparation of elastic or rigid, cellular polyisocyanate polyaddition products and or modifications in between.

A review on the preparation of cellular polyurethane (PU) elastomers, polyurethane (PU) foams and polyisocyanurate (PIR) foams and moldings having a compacted peripheral zone and a cellular core made from polyaddition products of this type, their mechanical properties and their use is given, for example, in the monographs High Polymers, Volume XVI, Polyurethanes, Parts I and II by J. H. Saunders and K. C. Frisch (Inter-science Publishers, New York 1962 and 1964 respectively), Kunststoff-Handbuch, Volume VII, Polyurethane, 1st Edition, 1966, edited by Dr. R. Vieweg and Dr. A. Höchtlen and 2nd Edition, 1983, edited by Dr. G. Oertel (Carl Hanser Verlag, Munich) and Intergralschaumstoffe, edited by Dr. H. Piechota and Dr. H. Röhr (Carl Hanser Verlag, Munich, Vienna, 1975).

The preparation of cellular plastics by the polyisocyanate polyaddition process uses essentially two types of blowing agent:

Low-boiling, inert liquids which evaporate under the influence of the exothermic polyaddition reaction, for example alkanes, such as butane, pentane, inter alia, or preferably halogenated hydrocarbons, such as methylene chloride, dichloromonofluoromethane, trichlorofluoromethane, inter alia, and chemical compounds which form blowing gases by a chemical reaction or thermal decomposition. Examples which may be mentioned are the reaction of water with isocyanates to form amines and carbon dioxide, which proceeds synchronously with the polyurethane preparation, and the cleavage of thermally labile compounds, for example azoisobutyronitrile, which gives as a cleavage product, toxic tetramethylsuccinodinitrile in addition to nitrogen, or azodicarbonamide, the use of which as a constituent of a blowing agent combination is described in EP-A 0 092 740 (CA 1,208,912). While the last-mentioned method, in which the thermally labile compounds, for example azo compounds, hydrazides, semicarbazides, N-nitroso compounds, benzoxazines, inter alia, (Kunststoffe 66 (1976), 10, pages 698 to 701), are usually incorporated into a previously prepared polymer or drum-coated on to the plastic granules and foamed by extrusion, have remained of minor industrial importance, the physical, low-boiling liquids, in particular chlorofluoroalkanes, are used world-wide on a large scale for the preparation of polyurethane foams or polyisocyanurate foams. The only disadvantage of these blowing gases is environmental pollution. By contrast, when blowing gases are formed by thermal cleavage or chemical reaction, cleavage products and/or reactive byproducts are produced and are included in the polyaddition product or chemically bonded and may result in an undesired change in the mechanical properties of the plastic. In the case of the formation of carbon dioxide from water and isocyanate, urea groups are formed in the polyaddition product, and, depending on their amount, may result in an improvement in the compressive strength as far as embrittlement of the polyurethane.

The mechanism of foam formation in the preparation of polyisocyanate polyaddition products and the effect of surface-active assistants based on siloxaneoxaalkylene copolymers on this reaction has been described by B. Kanner et al. (J. of Cellular Plastics, January 1969, pages 32 to 39).

According to these and other publications, an essential requirement for the formation of cellular polyisocyanate polyaddition products having a uniform cell structure and good mechanical properties is a homogeneous solution of the blowing agent, for example the carbon dioxide and/or the inert, low-boiling liquid, in the organic polyisocyanate and/or the compound containing reactive hydrogen atoms (Blowing Agents for Polyurethanes, by L. M. Zwolinski in Rubber Age, July 1975, pages 50 to 55, and GB-A-904,003). If the blowing agent is not soluble in the abovementioned components, only large-pore foams or in most cases no foams at all are obtained.

In order to avoid this disadvantage, U.S. Pat. No. 4,544,679 proposed employing specific polyol mixtures of increased chlorofluorohydrocarbon solubility and/or it is attempted to obtain homogeneous solutions of blowing agent and polyisocyanate and/or polyol by adding in some cases considerable amounts of solubilizers (K. Tanabe, I. Kamemura and S. Kozawa, 28th SPI Conference, 1984, pages 53 to 57).

Furthermore, DE-B-1 126 131 (U.S. Pat. No. 2,865,869) discloses a process for the preparation of polyester-polyurethane foams by reacting an alkyd resin and a polyisocyanate with addition of a reaction material which forms a gas at elevated temperature. Suitable gas-forming reaction materials are mixtures of tertiary alcohols and a catalytically effective amount of an inorganic or organic concentrated acid, eg. sulfuric acid, phosphoric acid, nitric acid, hydrochloric acid, picric acid or trifluoroacetic acid, or a Lewis acid, eg. aluminum chloride or boron trifluoride. A disadvantage of polyester-urethane foams of this type is their low stability to hydrolysis. Due to the formation of new carboxyl groups by hydrolysis of the ester groups, hydrolytic degradation of the polyaddition product is additionally accelerated autocatalytically, so that the polyester-urethane foams prepared on the basis of olefinically unsaturated polyesters and preferably mixtures of 2,4- and 2,6-tolylene diisocyanate have only inadequate mechanical properties. The patent does not describe processes for the preparation of structural foams and microcellular moldings by reaction injection molding (RIM).

It is an object of the present invention to improve the flow properties of reaction mixtures for the preparation of polyisocyanate polyaddition products, making possible uniform filling of the mold, even under pressure, by reaction injection molding (RIM), and giving moldings having a smooth, essentially pore-free surface.

A further object was to replace the fluorochlorohydrocarbons known as blowing agents for the preparation of cellular plastics by the polyisocyanate polyaddition process by other, environmentally friendly blowing agents.

We have found that, surprisingly, these objects can be achieved by using a tertiary alcohol, in the presence or absence of water, as the blowing agent.

The present invention accordingly provides a process for the preparation of cellular plastics by the polyisocyanate polyaddition process, by reacting a) an organic and/or modified organic polyisocyanate with
b) at least one high-molecular-weight compound containing at least two reactive hydrogen atoms, with the exception of alkyd resins, and, if desired,
c) a low-molecular-weight chain extender and/or crosslinking agent, in the presence of d) a blowing agent,
e) a catalyst and, if desired,
f) assistants and/or additives, wherein the blowing agent (d) used is at least one tertiary alcohol (di).

The present invention also provides a process for the production of moldings having a compacted peripheral zone and a cellular core made from a urethane-containing plastic, by reacting a) an organic and/or modified organic polyisocyanate with
b) at least one high-molecular-weight compound containing at least two reactive hydrogen atoms and, if desired,
c) a low-molecular-weight chain extender and/or crosslinking agent, in the presence of d) a blowing agent,
e) a catalyst and, if desired,
f) assistants and/or additives, in a closed mold with compaction, wherein the blowing agent (d) used is at least one tertiary alcohol (di).

The presence of a tertiary alcohol (di) considerably improves the flow properties of the reaction mixture so that it is possible to fill even large-volume molds having complicated geometries uniformly. Moldings having uniform mechanical properties are consequently obtained. Although the foaming is carried out in the absence of physical blowing agents and preferably in the presence of carbon dioxide formed by reaction of water with polyisocyanates, cellular moldings having an essentially pore-free, highly pronounced peripheral zone and a compact, smooth surface are obtained with compaction in a closed, expediently thermostatted mold. This highly pronounced peripheral zone occurs, in particular, in the preparation of urethane-containing hard structural foams having an overall density of from 0.3 to 1 g/cm$^3$, ie. thermosets. The mechanical properties of the thermosets prepared according to the invention are at least comparable, but usually better than those of products foamed using trichlorofluoromethane; however, the homogeneity of mechanical properties over the entire molding is advantageous, and therefore worthy of note.

The following applies to components (a) to (f), in particular the blowing agents (d) which can be used according to the invention, for the preparation of the cellular polyisocyanate polyaddition products, preferably the urethane- or urethane- and isocyanurate-containing foams:

a) Suitable organic polyisocyanates are the conventional aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'-and 2,2'-diphenylmethane diisocyanates and polyphenyl-polymethylene polyisocyanates (crude MDI), preferably those having a diphenylmethane diisocyanate isomer content of from 30 to 80% by weight, based on the weight of crude MDI, and mixtures of crude MDI and tolylene diisocyanates. The organic diisocyanates and polyisocyanates may be employed individually or in the form of mixtures.

Frequently, modified polyisocyanates are also used, i.e. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate or 2,4- or 2,6-tolylene diisocyanate modified by means of low-molecular-weight diols, triols, dialkylene glycols, trialkylene glycols or polyoxyalkylene glycols having molecular weights of up to 1800, specific examples of di- and polyoxyalkylene glycols, which can be employed individually or as mixtures, being diethylene glycol, dipropylene glycol, polyoxyethylene glycol, polyoxypropylene glycol and polyoxypropylene-polyoxyethylene glycol. NCO-containing prepolymers containing from 25 to 3.5% by weight, preferably from 21 to 14% by weight, of NCO, based on the total weight, and prepared from the polyester-and/or preferably polyether-polyols described below and 4,4'-diphenylmethane diisocyanate, mixtures of 2,4'- and 4,4'-diphenylmethane diisocyanate, 2,4-and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, e.g. based on 4,4'-, 2,4'- and/or 2,2'-diphenylmethane diisocyanate and/or 2,4- and/or 2,6-tolylene diisocyanate, have also proved successful.

The modified polyisocyanates may be used alone or mixed with one another or with unmodified organic polyisocyanates, e.g. 2,4'- or 4,4'-diphenylmethane diisocyanate, crude MDI or 2,4- and/or 2,6-tolylene diisocyanate.

Further organic polyisocyanates which have proven particularly successful and are preferred for use for the preparation of cellular elastomers are NCO-containing prepolymers containing from 25 to 9% by weight of NCO, in particular based on polyether- or polyester-polyols and one or more diphenylmethane diisocyanate isomers, advantageously 4,4'-diphenylmethane diisocyanate and/or modified urethane-containing organic polyisocyanates containing from 33.6 to 15% by weight of NCO, in particular based on 4,4'-diphenylmethane diisocyanate or diphenylmethane diisocyanate isomer mixtures, and those which are preferred for the preparation of flexible polyurethane foams are mixtures of 2,4- and 2,6-tolylene diisocyanates, mixtures of tolylene diisocyanates and crude MDI or, in particular, mixtures of the abovementioned prepolymers based on diphenylmethane diisocyanate isomers and crude MDI, and that which is preferred for the preparation of hard polyurethane foams or hard polyurethane polyisocyanurate foams is crude MDI.

b) The high-molecular-weight compounds b) containing at least two reactive hydrogen atoms are expediently those having a functionality of from 2 to 8 and a molecular weight of from 400 to 8000. Examples of compounds which have proven successful are polyether-polyamines and/or preferably polyols selected from the group comprising the polyether-polyols, polyester-polyols, prepared from alkanedicarboxylic acids and polyhydric alcohols, polythioether-polyols, polyester-amides, hydroxyl-containing polyacetals and hydroxyl-containing aliphatic polycarbonates, or mixtures of at least two of said polyols. Preference is given to polyester-polyols and/or polyether-polyols. By contrast, alkyd resins and polyester molding materials containing reactive, olefinically unsaturated double bonds are unsuitable as high-molecular-weight compounds b) containing at least two reactive hydrogen atoms.

Suitable polyester-polyols may be prepared, for example, from alkanedicarboxylic acids having from 2 to 12 carbon atoms, preferably alkanedicarboxylic acids having from 4 to 6 carbon atoms, or mixtures of alkanedicarboxylic acids and aromatic polycarboxylic acids and polyhydric alcohols, preferably diols, having from 2 to 12 carbon atoms, preferably from 2 to 6 carbon atoms, and/or alkylene glycols. Examples of suitable alkanedicarboxylic acids are succinic acid, glutaric acid, adipic acid, suberic acid, azelaic acid, sebacic acid and decanedicarboxylic acid. Examples of suitable aromatic polycarboxylic acids are phthalic acid, isophthalic acid and terephthalic acid. The alkanedicarboxylic acids may be used either individually or mixed with one another. The free dicarboxylic acids may also be replaced by the corresponding dicarboxylic acid derivatives, for example dicarboxylic acid esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35: 35 to 50: 20 to 32 parts by weight, and in particular adipic acid. Examples of dihydric and polyhydric alcohols, in particular diols or alkylene glycols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. ε-caprolactone, or hydroxycarboxylic acids, e.g. ω-hydroxycaproic acid, may also be employed.

The polyester-polyols may be prepared by polycondensing the mixtures of aromatic and aliphatic dicarboxylic acids and preferably alkanedicarboxylic acids and/or derivatives thereof and polyhydric alcohols without using a catalyst or preferably in the presence of an esterification catalyst, expediently in an inert gas atmosphere e.g. nitrogen, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the above-mentioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 480 to 3000, preferably from 1200 to 3000, in particular from 1800 to 2500.

However, the preferred polyols are polyether-polyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8 reactive hydrogen atoms in bound form, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternatively one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N- and N,N'-dialkyl-substituted diamines having from 1 to 4 carbon atoms in the alkyl moiety, such as unsubstituted or mono-or dialkyl-substituted ethylenediamine, diethylenetriamine, triethylenetetramine, 1,3-propylenediamine, 1,3- and 1,4-butylenediamine, 1,2-, 1,3-, 1,4-, 1,5-and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, such as ethanolamine, diethanolamine, N-methyl- and N-ethyl-ethanolamine, N-methyl- and N-ethyl-diethanolamine and triethanolamine, and ammonia. Preference is given to polyhydric alcohols, in particular dihydric to octahydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and saccharose.

The polyether-polyols, preferably polyoxypropylene-and polyoxypropylene-polyoxyethylene-polyols, have, for the preparation of elastic or semi-hard cellular polyisocyanate polyaddition products, a functionality of, preferably, 2 to 4, in particular 2 and/or 3, and molecular weights of preferably from 1800 to 6000, in particular from 2400 to 4000, and suitable polyoxytetramethylene glycols have a molecular weight of up to approximately 3500, and, for the preparation of hard cellular polyisocyanate polyaddition products, in particular thermosets, have a functionality of, preferably, from 3 to 8, in particular from 3 to 6, and a molecular weight of preferably from 400 to 3200, in particular from 600 to 2400.

Other suitable polyether-polyols are polymer-modifiedpolyether-polyols, preferably graft polyether-polyols, in particular those based on styrene and/or acrylonitrile and prepared by in situ polymerisation of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German patents 11 11 394, 12 22 669 (U.S. Pat. No. 3,304,273), 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tert-amino groups in bound form, and/or melamine and are described, for example, in EP-B-011 752 (U.S. Pat. No. 4,304,708), U.S. Pat. No. 4,374,209 and DE-A-32 31 497.

Like the polyester-polyols, the polyether-polyols can be used individually or in the form of mixtures. To prepare elastic thermosets, it may be expedient, for example, to use suitable mixtures of polyether-polyols having molecular weights of up to 2400 and those having molecular weights of from 2800 to 4000. Furthermore, they may be mixed with the graft polyether-polyols or polyester-polyols and the hydroxyl-containing polyester-amides, polyacetals, polycarbonates and-/or polyether-polyamines.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene.

The polyester-amides including, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Suitable polyether-polyamines can be prepared from the abovementioned polyether-polyols by conventional processes. Specific examples are the cyanoalkylation of polyoxyalkylene-polyols and subsequent hydrogenation of the resultant nitrile (U.S. Pat. No. 3,267,050) or the partial or complete amination of polyoxyalkylene-polyols using amines or ammonia in the presence of hydrogen and catalysts (DE 12 15 373).

c) The polyisocyanate polyaddition products and preferably the structural foams containing urethane groups or urethane and isocyanurate groups may be prepared with or without the use of chain extenders and/or crosslinking agents. However, it may prove advantageous, in order to modify the mechanical properties, for example the hardness, to add chain extenders, crosslinking agents or, if desired, mixtures thereof. The chain extenders and/or cross-linking agents used are diols and/or triols having a molecular weight of less than 400, preferably from 60 to 300. Examples are aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)-hydroquinone, triols, such as 1,2,4- and 1,3,5-trihydroxycyclohexane, glycerol and trimethylolpropane, and low-molecular-weight hydroxyl-containing polyalkylene oxides based on ethylene oxide and/or 1,2-propylene oxide, and the abovementioned diols and/or triols as initiator molecules.

Cellular polyurethane-polyurea elastomers can be prepared using, besides the abovementioned diols and-/or triols, or a mixture of these, secondary aromatic diamines, primary aromatic diamines, 3,3'-di- and/or 3,3',5,5'-tetraalkyl-substituted diaminodiphenylmethanes as chain extenders or crosslinking agents.

Specific examples of secondary aromatic diamines are N,N'-dialkyl-substituted aromatic diamines, which may be unsubstituted or substituted on the aromatic ring by alkyl radicals, having from 1 to 20, preferably from 1 to 4, carbon atoms in the N-alkyl radical, such as N,N'-diethyl-, N,N'-di-sec-pentyl-, N,N'-di-sec-hexyl-, N,N'-di-sec-decyl-, N,N'-dicyclohexyl-p- or -m-phenylenediamine, N,N'-dimethyl-, N,N'-diethyl-, N,N'-diisopropyl-, N,N'-di-sec-butyl- and N,N'-dicyclohexyl-4,4'-diaminodiphenylmethane and N,N'-di-sec-butylbenzidine.

The aromatic diamines used are expediently those which have at least one alkyl substituent in the ortho-position to the amino groups, are liquid at room temperature and are miscible with component (b), in particular the polyether-polyols. Furthermore, alkyl-substituted meta-phenylenediamines of the formulae

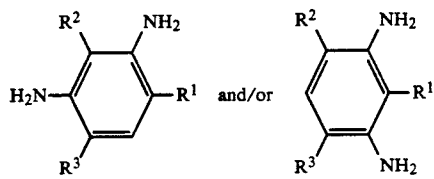

where $R^3$ and $R^2$ are identical or different and are methyl, ethyl, propyl or isopropyl, and $R^1$ is linear or branched alkyl having 1 to 10, preferably 4 to 6, carbon atoms, have proven successful.

Particularly successful alkyl radicals $R^1$ are those in which the branching point is on the $C^1$ carbon atom. Specific examples of radicals $R^1$ are methyl, ethyl, isopropyl, 1-methyloctyl, 2-ethyloctyl, 1-methylhexyl, 1,1-dimethylpentyl, 1,3,3-trimethylhexyl, 1-ethylpentyl, 2-ethylpentyl and preferably cyclohexyl, 1-methyl-n-propyl, tert-butyl, 1-ethyl-n-propyl, 1-methyl-n-butyl and 1,1-dimethyl-n-propyl.

Examples of suitable alkyl-substituted m-phenylenediamines are 2,4-dimethyl-6-cyclohexyl-, 2-cyclohexyl-4,6-diethyl-, 2-cyclohexyl-2,6-isopropyl-, 2,4-dimethyl-6-(1-ethyl-n-propyl)-, 2,4-dimethyl-6-(1,1-dimethyl-n-propyl)-, 2-(1-methyl-n-butyl)-4,6-dimethyl-1,3-phenylenediamine. Preference is given to 1-methyl-3,5-diethyl-2,4- and -2,6-phenylenediamines, 2,4-dimethyl-6-tert-butyl-, 2,4-dimethyl-6-isooctyl- and 2,4-dimethyl-6-cyclohexyl-1,3-m-phenylenediamine.

Examples of suitable 3,3'-di- and 3,3',5,5'-tetra-n-alkyl-substituted 4,4'-diaminodiphenylmethanes are 3,3'-di- and 3,3',5,5'-tetramethyl-, 3,3'-di- and 3,3',5,5'-tetraethyl- and 3,3'-di- and 3,3',5,5'-tetra-n-propyl-4,4'-diaminodiphenylmethane.

Preference is given to diaminodiphenylmethanes of the formula

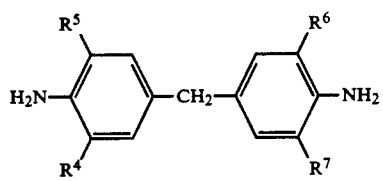

where $R^4$, $R^5$, $R^6$ and $R^7$ are identical or different and are methyl, ethyl, propyl, isopropyl, sec-butyl or tert-butyl, but at least one must be isopropyl or sec-butyl. The 4,4'-diaminodiphenylmethanes may also be used in a mixture with isomers of the formulae

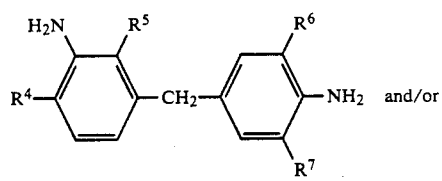

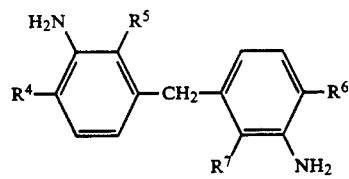

where $R^4$, $R^5$, $R^6$ and $R^7$ are as defined above.

Preference is given to 3,5-dimethyl-3',5'-diisopropyl- and 3,3',5,5'-tetraisopropyl-4,4'-diaminodiphenylmethane. The diaminodiphenylmethanes may be employed individually or in the form of mixtures.

The chain extenders and/or crosslinking agents (c) mentioned may be used individually or as mixtures of identical or different types of compound.

If used, the chain extenders, crosslinking agents or mixtures thereof are expediently employed in amounts of from 2 to 60% by weight, preferably from 8 to 50% by weight, in particular from 10 to 40% by weight, based on the weight of components (b) and (c).

d) The blowing agent (d) used according to the invention is a tertiary alcohol (di) or preferably a mixture of at least one tertiary alcohol (di) and water (dii).

Suitable tertiary alcohols are those of the formula

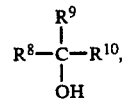

where $R^8$ is an aliphatic group containing at least one hydrogen atom bonded to the carbon attached directly to the carbinol group, while $R^9$ and $R^{10}$ are organic groups, e.g. aromatic, cycloaliphatic or preferably aliphatic groups. The aliphatic groups expediently have from 1 to 6 carbon atoms, preferably 1 or 2 carbon atoms.

Examples of suitable tertiary alcohols are 2-ethyl-2-butanol, 2-ethyl-2-pentanol, 2-methyl-2-pentanol, 3-methyl-3-hexanol, 4-methyl-4-heptanol, 4-propyl-4-heptanol, 4-ethyl-4-heptanol, 2,3-dimethyl-3-butanol, 2,3-dimethyl-3-pentanol, 2,3,4-trimethyl-3-pentanol, 3-ethyl-2,4-dimethyl-3-pentanol, 3-isopropyl-2,4-dimethyl-3-pentanol, 3-isopropyl-2,4-dimethyl-3-pentanol and preferably tertiary amyl alcohol, in particular tertiary butyl alcohol. The tertiary alcohols may be employed individually or in the form of mixtures of two or more tertiary alcohols. Particularly successful and therefore preferred blowing agents (d) are mixtures comprising
  di) at least one tertiary alcohol and
  dii) water.

Since the water reacts with the organic, modified or unmodified polyisocyanate (a) to form carbon dioxide and urea groups, this reaction simultaneously affects the compressive strength of the cellular moldings.

The tertiary alcohol (di) or the mixture thereof is expediently used in an amount of from 0.5 to 20% by weight, preferably from 0.7 to 10% by weight, in particular from 1 to 5% by weight, based on the total weight of components (a) to (c). The amount of blowing gas formed from the tertiary alcohol and available for foaming is usually less than 50 percent by volume, preferably from 10 to 30 percent by volume, of the amount of gas which can be calculated theoretically.

Since the amount of water present as a by-product in the polyester-polyols and in particular polyether-polyols preferably used as the high-molecular-weight compound (b) is usually sufficient, there is frequently no need for any separate addition of water when a blowing agent mixture of at least one tertiary alcohol and water is used. However, if water must be additionally incorporated into the formulation, it is expediently used in an amount of from 0.05 to 2% by weight, preferably from 0.09 to 1% by weight, based on the weight of components (a) to (c).

e) The catalysts (e) used to prepared the cellular plastics by the polyisocyanate polyaddition process are, in particular, compounds which greatly accelerate the reaction of the hydroxyl-containing compounds of component (b) and, if used, (c) with the organic, modified or unmodified polyisocyanate (a). Suitable compounds are organometallic compounds, preferably organotin compounds, such as tin(II) salts of organic carboxylic acids, e.g. tin(II) acetate, tin(II) octanoate, tin(II) ethylhexanoate and tin(II) laurate, and dialkyltin(IV) salts of organic carboxylic acids, e.g. dibutyltin diacetate, dibutyltin dilaurate, dibutyltin maleate and dioctyltin diacetate. The organometallic compounds are employed alone or, preferably, in combination with highly basic amines, for example amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexylmorpholine, N,N,N',N'-tetramethylethylenediamine, N,N,N',N'-tetramethylbutanediamine and -hexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane and, preferably, 1,4-diazabicyclo[2.2.2]octane and alkanolamine compounds such as triethanolamine, triisopropanolamine, N-methyl- and N-ethyldiethanolamine and dimethylethanolamine.

Suitable catalysts, in particular if a relatively large excess of polyisocyanate is used, are tris(dialkylaminoalkyl)-s-hexahydrotriazines, preferably tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having from 10 to 20 carbon atoms and possibly containing lateral OH groups. From 0.001 to 5% by weight, in particular from 0.05 to 2% by weight of catalyst or catalyst combination is preferably used, based on the weight of component (b).

f) It is also possible to add, if desired, assistants and/or additives (f) to the reaction mixture for the preparation of the cellular plastics by the polyisocyanate polyaddition process. Specific examples are surfactants, foam stabilizers, cell regulators, release agents, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxaneoxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore oligomeric acrylates containing polyoxyalkylene and fluoroalkane radicals as side groups. The surfactants are usually used in amounts of from 0.01 to 5 parts by weight, based on 100 parts by weight of component (b).

Specific examples of suitable release agents are products of the reaction of fatty acid esters with polyisocyanates, salts made from amino-containing polysiloxanes and fatty acids, salts made from saturated or unsaturated (cyclo)aliphatic carboxylic acids having at least 8 carbon atoms and tertiary amines, and, in particular, internal release agents, e.g. carboxylic acid esters and/or carboxamides, prepared by esterification or amidation of a mixture of montanic acid and at least one aliphatic carboxylic acid having at least 10 carbon atoms with at least difunctional alkanolamines, polyols and/or polyamines having molecular weights of from 60 to 400 (EP-A-153 639), mixtures of organic amines, metal salts of stearic acid and organic mono- and/or dicarboxylic acids or anhydrides thereof (DE-A-3 607 447) or mixtures of an imino compound, the metal salt of a carboxylic acid and, if desired, a carboxylic acid (U.S. Pat. No. 4,764,537).

For the purposes of the invention, fillers, in particular reinforcing fillers, are conventional organic and inorganic fillers, reinforcing agents, weighting agents, agents for improving the abrasion behavior in paints, coating agents, etc. Specific examples are inorganic fillers, such as silicate minerals, for example phyllosilicates, such as antigorite, serpentine, hornblendes, amphiboles, chrysotile, and talc; metal oxides, such as kaolin, aluminum oxides, titanium oxides and iron oxides, metal salts, such as chalk, baryte and inorganic pigments, such as cadmium sulfide, zinc sulfide and glass, inter alia. Preference is given to kaolin (china clay), aluminum silicate and coprecipitates of barium sulfate and aluminum silicate, and natural and synthetic fibrous minerals, such as wollastonite, metal fibers and in particular glass fibers of various lengths, which may or may not be sized. Examples of suitable organic fillers are carbon black, melamine, colophony, cyclopentadienyl resins and graft polymers, and cellulose fibers, polyamide fibers, polyacrylonitrile fibers, polyurethane fibers and polyester fibers based on aromatic and/or aliphatic dicarboxylic acid esters, and in particular carbon fibers.

The inorganic and organic fillers may be used individually or as mixtures and are advantageously introduced into the reaction mixture in amounts of from 0.5 to 50% by weight, preferably from 1 to 40% by weight, based on the weight of components (a) to (c), but the content of mats, nonwovens and woven materials made from natural and synthetic fibers may reach values of up to 80% by weight.

Examples of suitable flameproofing agents are tricresyl phosphate, tris-2-chloroethyl phosphate, trischloropropyl phosphate and tris-2,3-dibromopropyl phosphate.

In addition to the abovementioned halogen-substituted phosphates, it is also possible to use inorganic flameproofing agents, such as red phosphorus, aluminum oxide hydrate, antimony trioxide, arsenic oxide, ammonium polyphosphate and calcium sulfate, or cyanuric acid derivatives, e.g. melamine, or mixtures of two or more flameproofing agents, e.g. ammonium polyphosphate and melamine, and also, if desired, starch, e.g. corn starch, in order to flameproof the polyisocyanate polyaddition products. In general, it has proven expedient to use from 5 to 50 parts by weight, preferably from 5 to 25 parts by weight, of said flameproofing agents per 100 parts by weight of component (b).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers 1962 and 1964 respectively, or Kunststoff-Handbuch, Polyurethane, Volume VII, Hanser-Verlag, Munich, Vienna, 1st and 2nd Editions, 1966 and 1983.

To prepare the cellular urea- and/or preferably urethane-containing plastics, the organic polyisocyanate (a), the high-molecular-weight compound containing at least two reactive hydrogen atoms (b) and, if used, the chain extender and/or crosslinking agent (c) are reacted in such amounts that the equivalence ratio between the NCO groups of the polyisocyanate (a) and the total number of reactive hydrogen atoms of component (b) and, if used, (c) is from 1:0.85 to 1.25, preferably from 1:0.95 to 1.15. If the cellular plastics contain, at least partially, isocyanurate groups in bound form, a ratio between the NCO groups of the polyisocyanate (a) and the total number of reactive hydrogen atoms of component (b) and, if used, (c) of from 1.5 to 20:1, preferably from 1.5 to 8:1, is usually used.

The cellular plastics comprising polyisocyanate polyaddition products, preferably cellular elastomers or in particular foams, are advantageously prepared by the one-shot process, for example using reaction injection molding, high-pressure molding or low-pressure molding in open or closed molds, for example metallic molds, e.g. made of aluminum, cast iron or steel. It has proven particularly advantageous to use the two-component process and to combine components (b), (d), (e) and, if used, (c) and (f) in component (A) and to use, as component (B), the organic polyisocyanate, modified polyisocyanate (a) or a mixture of said polyisocyanates and, if desired, a blowing agent (d).

The starting components are mixed at from 15° to 90° C., preferably from 20° to 35° C., and introduced into the open mold or, if desired under superatmospheric pressure, into the closed mold. As stated above, the mixing can be carried out by means of a mechanical stirrer or stirring screw or under high pressure by the countercurrent injection method. The mold temperature is expediently from 20° to 90° C., preferably from 30° to 60° C., in particular from 45° to 50° C.

In a preferred embodiment, the cellular plastics, in particular cellular elastomers, are prepared using reaction injection molding in a closed mold and the moldings are produced with a compacted peripheral zone and a cellular core in a closed mold with compaction to a degree of from 1.5 to 8.5, preferably from 2 to 6.

The cellular elastomers prepared by the process according to the invention have approximate densities of from 0.70 to 1.2 g/cm$^3$, preferably from 0.8 to 1.0 g/cm$^3$, it being possible for the density of filler-containing products to achieve higher values, for example of up to 1.4 g/cm$^3$ or more. Moldings made from cellular elastomers of this type are used in the automotive industry, for example as external parts, e.g. rear spoilers and fenders, and internal paneling, and as shoe soles.

The soft-elastic, semihard and hard foams prepared by the process according to the invention and the corresponding structural foams have a density of from 0.02 to 0.9 g/cm$^3$, the densities of the foams preferably being from 0.025 to 0.24 g/cm$^3$, in particular from 0.03 to 0.1 g/cm$^3$, the overall densities of the semihard and hard structural foams preferably being from 0.2 to 0.9 g/cm$^3$, in particular from 0.35 to 0.8 g/cm$^3$, and the overall densities of the soft-elastic structural foams preferably being from 0.08 to 0.7 g/cm$^3$, in particular from 0.12 to 0.6 g/cm$^3$. The foams and structural foams are used, for example, in the vehicle industry, e.g. automotive, aircraft and shipbuilding industries, for example for armrests, headrests or safety covers, in the furniture and sports article industries as, for example, cushioning materials, casing parts, e.g. for office and domestic equipment, window frames, skiboot inners, ski cores inter alia. They are particularly suitable as an insulation material in the construction and refrigerator sectors.

EXAMPLE 1

Component A

A mixture was prepared at room temperature from the following substances:
49 parts by weight of a polyether-polyol having an OH number of 480, prepared by poly-addition of 1,2-propylene oxide on to ethylenediamine,
35 parts by weight of a polyether-polyol having an OH number of 56, prepared by poly-addition of 1,2-propylene oxide on to ethylene glycol,
8 parts by weight of glycerol,
2 parts by weight of a silicone oil (Tegostab ® B8418 from Goldschmidt),
0.75 part by weight of methylimidazole,
0.2 part by weight of water and
5 parts by weight of tert-butanol.

Component B

A mixture of diphenylmethane diisocyanates and polyphenyl-polymethylene polyisocyanates containing 31% by weight of NCO (Lupranat ® M 20 S from BASF Aktiengesellschaft).

100 parts by weight of component A and 118 parts by weight of component B were mixed at 23° C. with vigorous stirring. Some of the foamable reaction mixture was transferred into an open mold and allowed to expand. The freely foamed density of the resultant foam was 0.15 g/cm$^3$.

Another portion of the foamable reaction mixture was introduced into one end of a mold, thermostatted at 60° C., comprising surface-epoxidised aluminum and measuring 100×30×1 cm, in such an amount that, after expansion and curing in the closed mold, a hard structural foam sheet having an overall density of 0.6 g/cm³ was produced.

The thickness, determined by microscopy, of the essentially compact peripheral zone was from 1.3 to 1.5 mm, and the shrinkage of the molding after cooling was from 0.4 to 0.5%.

The Shore D hardness was measured every 10 cm along the flow path. The following values were determined:

| Flow distance [cm] | 10 | 20 | 30 | 40 | 50 | 60 | 70 | 80 | 90 | 100 |
|---|---|---|---|---|---|---|---|---|---|---|
| Shore D hardness | 70 | 70 | 69 | 71 | 70 | 70 | 70 | 69 | 68 | 69 |

This gives a means of 70 and a variation coefficient of 1.2% (variation coefficient = standard deviation divided by the mean, as a measure of the uniformity of the flow part).

COMPARATIVE EXAMPLE I

Component A

As in Example 1, but with the 0.2 part by weight of water replaced by 0.75 part by weight, and the addition of tertiary butanol being omitted.

Component B

As in Example 1.

The molding was likewise produced by a method similar to that of Example 1.

The molding had a compacted peripheral zone in a thickness of only 0.6 to 0.8 mm, while the shrinkage increased to 0.8%.

The following Shore D hardnesses were measured on the molding over the length of the flow path:

| Flow distance [cm] | 10 | 20 | 30 | 40 | 50 | 60 | 70 | 80 | 90 | 100 |
|---|---|---|---|---|---|---|---|---|---|---|
| Shore D hardness | 69 | 67 | 67 | 66 | 66 | 65 | 65 | 65 | 64 | 64 |

The mean Shore D hardness was 66, and the variation coefficient was 2.35. Due to the worse formation of the peripheral zone, the hardness of the molding was not only substantially lower, but the uniformity over the entire flow path was worse by a factor of almost 2.

EXAMPLE 2

Component A

A mixture was prepared at room temperature comprising:
28 parts by weight of a polyether-polyol having an OH number of 550, prepared by poly-addition of 1,2-propylene oxide on to trimethylolpropane,
17 parts by weight of polyether-polyol having an OH number of 400, prepared by poly-addition of 1,2-propylene oxide on to glycerol,
23 parts by weight of a polyoxypropylene (75% by weight)-polyoxyethylene (25% by weight)-polyol having an OH number of 35, prepared by polyaddition of 1,2-propylene oxide on to glycerol and subsequent polyaddition of ethylene oxide onto the glycerol-1,2-propylene oxide adduct,
15 parts by weight of glycerol
0.3 part by weight of water,
6 parts by weight of tert-butanol,
2.4 parts by weight of a silicone oil (Tegostab ® B 8418 from Goldschmidt),
1.5 parts by weight of N,N-dimethylcyclohexylamine
0.8 parts by weight of methylimidazole and
6 parts by weight of trichloroethyl phosphate

Component B

As in Example 1.

100 parts by weight of component A and 133 parts by weight of component B were mixed at 23° C. with vigorous stirring, and foamed by a method similar to that of Example 1 with compaction using an open and a closed mold.

The density of the freely foamed molding was 0.13 g/cm³.

The hard structural foam sheet produced had an overall density of 0.5 g/cm³, a Shore D hardness of 72 and a variation coefficient of the Shore D hardness along the flow path of 1.1%.

COMPARATIVE EXAMPLE II

The procedure was similar to that of Example 2, but the mixture of 0.3 parts by weight of water and 6 parts by weight of tertiary butanol in component A was replaced by only 0.9 parts by weight of water. The resultant molding had an overall density of 0.6 g/l, a mean Shore D hardness of 67 and a variation coefficient of the Shore D hardness along the flow path of 3.0%.

EXAMPLE 3

Component A

A mixture was prepared at room temperature comprising:
42 parts by weight of a polyoxypropylene (75% by weight)-polyoxyethylene (25% by weight)-polyol having an OH number of 23, prepared by polyaddition of 1,2-propylene oxide on to ethylene glycol and subsequent polyaddition of ethylene oxide on to the ethylene glycol-1,2-propylene oxide adduct,
40 parts by weight of a polyoxypropylene (75% by weight)-polyoxyethylene (25% by weight)-polyol having an OH number of 35, prepared by polyaddition of 1,2-propylene oxide on to glycerol and subsequent polyaddition of ethylene oxide on to the glycerol-1,2-propylene oxide adduct,
5 parts by weight of ethylene glycol
0.3 part by weight of triethylenediamine
0.2 part by weight of water
5 parts by weight of tert-butanol.

Component B

Polyisocyanate mixture containing urethane groups and 28% by weight of NCO, prepared by partial reaction of a mixture of diphenylmethane diisocyanates and polyphenyl-polymethylene polyisocyanates containing 31% by weight of NCO with dipropylene glycol.

100 parts by weight of component A and 48 parts by weight of component B were mixed vigorously, and the reaction mixture was transferred into an aluminum mold measuring 20×20×1 cm and thermostatted at 50° C., in such an amount that a molding having an overall density of 0.35 g/cm³ was produced.

After the reaction mixture had been expanded and allowed to cure in the closed mold, a flexible structural foam sheet having a Shore A hardness of 37, a well-formed compact peripheral zone and a smooth, pore-free surface was obtained.

COMPARATIVE EXAMPLE III

The procedure was similar to that of Example 3, but 0.5 part by weight of water was used in component A, and the addition of the tertiary butanol was omitted.

The molding produced had a Shore A hardness of 29 and a porous peripheral zone having a pore-containing skin.

We claim:

1. A process for the preparation of the production of integral skin moldings having a compact peripheral zone and a cellular core comprised of a polyurethane and/or polyisocyanurate polymer, comprising reacting
    a) an organic polyisocyanate with
    b) at least one high molecular weight compound containing at least two reactive hydrogen atoms, and
    c) optionally, a low molecular weight chain extender and/or cross-linking agent, in the presence of
    d) an acid free blowing agent selected from the group consisting of
        di) one or more tertiary alcohols, and
        dii) one or more tertiary alcohols in admixture with water, and
    e) an effective amount of a urethane and/or isocyanurate promoting catalyst, in a closed mold with compaction.

2. A process as claimed in claim 1, wherein the blowing agent (d) used is a mixture of
    di) at least one tertiary alcohol and
    dii) water.

3. A process as claimed in claim 1, wherein the blowing agent (d) used is from 0.5 to 20% by weight, based on the total weight of components (a) to (c), of at least one tertiary alcohol (di).

4. A process as claimed in claim 1, wherein the blowing agent (d) used is a mixture comprising
    di) from 0.5 to 20% by weight of at least one tertiary alcohol and
    dii) from 0.05 to 2% by weight of water, the percentages by weight being based on the total weight of components (a) to (c).

5. A process as claimed in claim 1, wherein the blowing agent (d) used is tertiary butanol (di).

6. A process as claimed in claim 1, wherein the reaction is carried out in a closed mold with compaction to a degree of from 2 to 6.

7. A process as claimed in claim 1, wherein the organic polyisocyanate (a) used is a mixture of a diphenylmethane diisocyanate and a polyphenyl-polymethylene polyisocyanate having a diphenylmethane diisocyanate isomer content of from 30 to 80% by weight.

8. A process as claimed in claim 1 wherein the high-molecular-weight compound containing at least two reactive hydrogen atoms (b) is a polyether-polyol, polyester-polyol made from an alkanedicarboxylic acid and a polyhydric alcohol, a polyester-amide, a hydroxyl-containing polyacetal and/or a hydroxyl-containing aliphatic polycarbonate.

9. A process as claimed in claim 1, wherein the high-molecular-weight compound (b) used is at least one polyether-polyol having a functionality of from 3 to 8 and a molecular weight of from 400 to 3200.

* * * * *